(12) United States Patent
Hofmann et al.

(10) Patent No.: US 11,935,243 B2
(45) Date of Patent: Mar. 19, 2024

(54) GENERATIVE ADVERSARIAL NETWORKS FOR IMAGE SEGMENTATION

(71) Applicant: TomTom Global Content B.V., Amsterdam (NL)

(72) Inventors: Michael Hofmann, Amsterdam (NL); Nora Baka, Delft (NL); Cedric Nugteren, Amsterdam (NL); Mohsen Ghafoorian, Diemen (NL); Olaf Booij, Leiden (NL)

(73) Assignee: TomTom Global Content B.V., Amsterdam (NL)

( * ) Notice: Subject to any disclaimer, the term of this patent is extended or adjusted under 35 U.S.C. 154(b) by 623 days.

(21) Appl. No.: 17/263,813

(22) PCT Filed: Jun. 7, 2019

(86) PCT No.: PCT/EP2019/064945
§ 371 (c)(1),
(2) Date: Jan. 27, 2021

(87) PCT Pub. No.: WO2019/238560
PCT Pub. Date: Dec. 19, 2019

(65) Prior Publication Data
US 2021/0303925 A1    Sep. 30, 2021

(30) Foreign Application Priority Data

Jun. 12, 2018 (GB) ...................................... 1809604

(51) Int. Cl.
*G06T 7/11* (2017.01)
*G06F 18/214* (2023.01)
(Continued)

(52) U.S. Cl.
CPC .............. *G06T 7/11* (2017.01); *G06F 18/214* (2023.01); *G06N 3/045* (2023.01); *G06N 3/08* (2013.01);
(Continued)

(58) Field of Classification Search
CPC ............. G06T 7/11; G06T 2207/20081; G06T 2207/20084; G06T 2207/30256;
(Continued)

(56) References Cited

U.S. PATENT DOCUMENTS

| 2019/0065899 A1* | 2/2019 | Movshovitz-Attias ...................... G06F 18/217 |
| 2019/0095722 A1* | 3/2019 | Kang ..................... G08G 1/167 |
| 2019/0340235 A1* | 11/2019 | Osbourne ............. G10L 19/083 |

FOREIGN PATENT DOCUMENTS

GB        2555431 A    2/2018

OTHER PUBLICATIONS

Search Report dated Dec. 3, 2018 for United Kingdom patent application No. 1809604.0.
(Continued)

*Primary Examiner* — Christopher M Brandt
(74) *Attorney, Agent, or Firm* — Park, Vaughan, Fleming & Dowler LLP

(57) ABSTRACT

A method is provided of training a generative adversarial network for performing semantic segmentation of images. The generative adversarial network includes a generator neural network and a discriminator neural network. The method includes providing an image as input to the generator neural network, receiving a predicted segmentation map for the image from the generator neural network, providing i) the image, ii) the predicted segmentation map, and iii) ground-truth label data corresponding to the image, as distinct training inputs to the discriminator neural network,
(Continued)

determining a set of one or more outputs from the discriminator neural network in response to said training inputs, and training the generator neural network using a loss function that is a function of said set of outputs from the discriminator neural network.

20 Claims, 4 Drawing Sheets

(51) Int. Cl.
    *G06N 3/045* (2023.01)
    *G06N 3/08* (2023.01)
    *G06V 10/764* (2022.01)
    *G06V 10/82* (2022.01)
    *G06V 20/10* (2022.01)
    *G06V 20/56* (2022.01)
    *G06V 20/70* (2022.01)

(52) U.S. Cl.
    CPC ............ *G06V 10/764* (2022.01); *G06V 10/82* (2022.01); *G06V 20/10* (2022.01); *G06V 20/56* (2022.01); *G06V 20/588* (2022.01); *G06V 20/70* (2022.01); *G06T 2207/20081* (2013.01); *G06T 2207/20084* (2013.01); *G06T 2207/30256* (2013.01)

(58) Field of Classification Search
    CPC ........ G06F 18/214; G06N 3/045; G06N 3/08; G06N 3/047; G06V 10/764; G06V 10/82; G06V 20/10; G06V 20/56; G06V 20/588; G06V 20/70
    See application file for complete search history.

(56) References Cited

OTHER PUBLICATIONS

International Search Report dated Sep. 18, 2019 for International patent application No. PCT/EP2019/064945.
Ghafoorian, et al., "EL-GAN: Embedding Loss Driven Generative Adversarial Networks for Lane Detection," Jan. 2019.
Singh et al., "Retinal Optic Disc Segmentation using Conditional Generative Adversarial Network," Jun. 2018.
Zhao et al., "Lung segmentation in CT images using a fully convolutional neural network with multi-instance and conditional adversary loss," Apr. 2018.
Souly et al., "Semi Supervised Semantic Segmentation Using Generative Adversarial Network," Oct. 2017.
Xue et al., "SegAN: Adversarial Network with Multi-scale L Loss for Medical Image Segmentation," Jun. 2017.
Xing, Y. et al., Advances in Vision-Based Lane Detection: Algorithms, Integration, Assessment, and Perspectives on ACP-Based Parallel Vision, IEEE/CAA Journal of Automatica Sinica, vol. 5, No. 3, May 2018.

* cited by examiner

Label     After DB 3     After DB 5     After DB 7

GENERATIVE ADVERSARIAL NETWORKS FOR IMAGE SEGMENTATION

BACKGROUND OF THE INVENTION

This invention relates to neural networks for image segmentation, and to generative adversarial networks in particular.

Certain convolutional neural networks (CNNs) have been successfully applied to various computer vision problems by posing these problems as image segmentation problems. Examples include road scene understanding for autonomous driving, and interpreting medical imaging. For such applications, networks are typically trained with multi-class per-pixel labels that together form an image-sized segmentation map. The output of such a network is then again an image-sized map, representing per-pixel class probabilities.

However, additional post-processing steps may be needed afterwards, because the output of semantic segmentation networks is not necessarily quality-preserving. Output segmentation maps are probabilistic and of a different distribution compared to the corresponding labels. The fundamental reason behind this is the way the training loss is formulated (e.g. per-pixel cross entropy), such that each output pixel in the segmentation map is considered independently of all others, i.e. no explicit inter-pixel consistency is enforced.

Examples of post-processing steps include applying a conditional random field (CRF), applying a second separately trained network, or non-learned problem-specific algorithms. Drawbacks of such approaches are that they require effort to construct, can have many hyper-parameters, are problem specific, and might still not capture the final objective. For example, a CRF either only captures local consistencies, or imposes high computation costs to ensure long-distance dependencies, and needs to be trained separately.

Another approach to ensure certain prediction qualities, is to add extra loss terms that represent the degree to which the quality is preserved. However, it is often challenging to come up with efficient and differentiable loss terms for each target quality. A potential solution for the lack of quality preservation in semantic segmentation problems is to use generative adversarial networks (GANs) to 'learn' the desired loss function. GANs work by training two networks in an alternating fashion in a minimax game: a generator is trained to produce results, while a discriminator is trained to distinguish generated (predicted) segmentation map data ('fake') from ground truth labels ('real').

GANs have been applied to semantic segmentation problems to try to address the aforementioned issues with the per-pixel loss. During training, the generator produces semantic segmentation maps, while the discriminator alternately observes ground truth labels and predicted segmentation maps.

The paper "SegAN: Adversarial Network with Multi-scale $L_1$ Loss for Medical Image Segmentation" by Xue et al., ArXiv e-prints (June 2017), discloses a generative adversarial network (GAN) for brain-tumor segmentation. Instead of having separate losses for the generator network and for the discriminator network, it uses a common multi-scale $L_1$ loss function for training both generator and discriminator.

However, the applicant has recognized that GAN's such as that disclosed in the SegAN paper may be effective at segmenting large, bulbous structures, such as brain tumors, but do not always work so effectively on other types of image data. In particular, they can struggle to identify thin structures, such as road divider markings, accurately.

The present invention seeks to provide a novel approach to training a generative adversarial network that can lead to better image segmentation performance, at least for certain types of input.

SUMMARY OF THE INVENTION

From a first aspect, the invention provides a method of training a generative adversarial network for performing semantic segmentation of images, wherein the generative adversarial network comprises:
  a generator neural network; and
  a discriminator neural network,
the method comprising:
  providing an image as input to the generator neural network;
  receiving a predicted segmentation map for the image from the generator neural network;
  providing i) the image, ii) the predicted segmentation map, and iii) ground-truth label data corresponding to the image, as distinct training inputs to the discriminator neural network;
  determining a set of one or more outputs from the discriminator neural network in response to said training inputs; and
  training the generator neural network using a loss function that is a function of said set of outputs from the discriminator neural network.

From a second aspect, the invention provides a computer processing system implementing a generative adversarial network for performing semantic segmentation of images, wherein the generative adversarial network comprises:
  a generator neural network;
  a discriminator neural network; and
  training logic,
and wherein the training logic is configured to:
  provide an image as input to the generator neural network;
  receive a predicted segmentation map for the image from the generator neural network;
  provide i) the image, ii) the predicted segmentation map, and iii) ground-truth label data corresponding to the image, as distinct training inputs to the discriminator neural network;
  determine a set of one or more outputs from the discriminator neural network in response to said training inputs; and
  train the generator neural network using a loss function that is a function of said set of outputs from the discriminator neural network.

From a third aspect, the invention provides computer software comprising instructions which, when executed on a computer processing system, cause the computer processing system to train a generative adversarial network for performing semantic segmentation of images, wherein the generative adversarial network comprises:
  a generator neural network; and
  a discriminator neural network,
and wherein the instructions cause the computer processing system to:
  provide an image as input to the generator neural network;
  receive a predicted segmentation map for the image from the generator neural network;
  provide (i) the image, (ii) the predicted segmentation map, and (iii) ground-truth label data corresponding to the image, as distinct training inputs to the discriminator neural network;

determine a set of one or more outputs from the discriminator neural network in response to said training inputs; and train the generator neural network using a loss function that is a function of said set of outputs from the discriminator neural network.

The image may be a photographic image of a road comprising one or more lane markings. The method may include training the generative adversarial network to identify lane markings in images.

The computer processing system may include a memory storing the image and storing the ground-truth label data corresponding to the image, wherein the image is a photographic image of a road comprising one or more lane markings, and wherein the ground-truth label data comprises data representing the one or more lane markings.

The computer software may further comprise instructions that implement the generator neural network and/or that implement the discriminator neural network. The computer software may be stored on a non-transient storage medium (such as a magnetic or solid-state memory), or may be carried on a transient signal (such as an electrical or electromagnetic signal).

Thus it will be seen that, in accordance with the invention, the generator neural network is trained by providing three separate inputs to the discriminator, being: an image, the generator's predicted segmentation map for the image, and the ground-truth label for the image.

This contrasts with prior approaches in which a discriminator receives, as an input vector, either an image and its corresponding segmentation map, or an image and its corresponding ground-truth labels, but not an image, its corresponding segmentation map, and its corresponding ground-truth labels, at the same time. By feeding the discriminator with an input vector comprising a prediction and a label for a common image, it is possible, in embodiments of the present invention, for the discriminator to obtain much more useful feedback to steer the training of the adversarial segmentation network in the direction of more realistic labels.

This approach also contrasts with the SegAN network, mentioned above, in which the generator is trained by providing the discriminator with the pixel-wise product of the image and a predicted segmentation map, and does not receive the full input image separate from the predicted segmentation map. The applicant has realized that providing the full image, segmentation map, and label data, as separate inputs to the discriminator, gives the discriminator more flexibility to decide how to fuse the representations of input image and predictions, rather getting a fixed multiplied mixture. This enables networks embodying the present invention to offer better performance, at least on some data types—especially (but not exclusively) when semantically segmenting images containing thin structures such as road lane markings.

The set of one or more outputs from the discriminator neural network are not necessarily a final output of the discriminator network (e.g., a probability between zero and one). Rather, they may comprise one or more feature-map (i.e., embedding) outputs taken from one or more predetermined layers within the discriminator neural network.

The loss function may comprise an embedding term that represents a difference between i) an embedding (i.e., feature-map) at a predetermined layer of the discriminator neural network when the predicted segmentation map is input to the discriminator neural network, and ii) an embedding at the predetermined layer of the discriminator neural network when the ground-truth label data is input to the discriminator neural network. The difference may be a distance according to an appropriate norm. While it could be $L_1$ distance, in a preferred set of embodiments, the difference is the $L_2$ distance. The applicant has determined that minimizing an $L_2$ loss can give better results than an $L_1$ loss, at least for some types of input images, because an $L_2$ loss prefers smaller average differences in general which makes it well suited to matching embeddings.

The predetermined layer may be after (e.g., immediately after) the first dense block that contains one or more shared convolution layers with both the image and the predicted segmentation map (or ground-truth label data). It may be after (e.g., immediately after) the final dense block before a classifier of the network. Alternatively, it may be a layer between these two layers.

The generator neural network may be trained to minimize the loss function. The training may comprise applying a gradient descent method to the network.

The loss function may comprise a fitness term in addition to an embedding term. The fitness term may be a pixel-level loss term. It may represent relatively low-level fitness of the prediction/label. The embedding loss term may represent relatively high-level consistency. The loss function may comprise a weighting parameter, $\lambda$, for weighting the embedding term relative to the fitness term. The system may comprise an input for receiving a value for the weighting parameter—e.g., from a user. This advantageously allow embodiments of the invention to be configured for a desired importance of pixel-level loss.

The discriminator neural network may also be trained. It may be trained to minimize a loss on its discrimination between predicted segmentation maps and ground-truth label data.

The training logic may be configured to train the generator alternately with the discriminator.

The generative adversarial network may be trained on a plurality of images, which may comprise one hundred, one thousand, ten-thousand, or more, images.

In some embodiments, the image may be a photographic image from a camera. It may be an image of a road (e.g., a multi-lane roadway or carriageway), which may contain one or more lane markings. The ground-truth label data may comprise data representing one or more lane markings in the image (e.g., comprising coordinates, vectors and/or polylines). The generative adversarial network may be trained to identify a linear structure in an image. It may be trained to identify a road marking, such as a lane marking.

The generative adversarial network may be configured to have a training mode and a running mode. The training may take place during a training phase. After the training phase, the network may be configured to receive an input image and to segment the input image. It may be configured to output a predicted segmentation map for the image.

The computer processing system may comprise an input for receive image data from a camera. It may be an in-vehicle computer processing system. It may be configured to output segmentation data—e.g., to an autonomous driving system.

The generator neural network and/or discriminator neural network may comprise any number of convolution layers, dense blocks, and other conventional layers. The generator neural network and/or discriminator neural network and/or training logic may comprise software instructions for a processor, or may comprise dedicated hardware logic, or may comprise a combination of both. The computer processing system may comprise one or more of: CPUs, DSPs, GPUs, FPGAs, ASICs, volatile memory, non-volatile memory, inputs, outputs, displays, network connections, power supplies, radios, clocks, and any other appropriate components. It may be configured to store or display or output a predicted segmentation map or other segmentation data.

Some embodiments may achieve segmentation predictions that are sufficiently similar to the training labels that no additional problem-specific loss terms and/or post-processing steps are required.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Described below is a set of neural networks embodying the invention. This novel type of artificial neural network will be referred to herein as "EI-GAN"—short for "Embedding-loss Generative Adversarial Network". It uses adversarial training with embedding loss for semantic segmentation. The method can be applied to many different segmentation problems. It has, however, been tested extensively on lane segmentation within images acquired by cameras on automotive vehicles, and has been found to be particularly effective at this task. It will be exemplified with reference to this application area, but it should be understood that it may be applied to other image segmentation problems also.

By way of background, a typical current approach to semantic segmentation with Generative Adversarial Networks (GANs) will first be described.

Adversarial training can be used to ensure a higher level of label-resembling qualities such as smoothness, preserving neighborhood consistencies, and so on. This is typically done by using a discriminator network that learns a loss function for these desirable properties over time rather than formulating these properties explicitly.

A typical approach for benefiting from adversarial training for semantic segmentation involves formulating a loss function for the segmentation network (generator) that consists of two terms: one term concerning low-level pixel-wise prediction/label fitness ($\mathcal{L}_{fit}$) and another (adversarial) loss term for preserving higher-level consistency qualities ($\mathcal{L}_{adv}$), conditioned on the input image:

$$\mathcal{L}_{gen}(x,y;\theta_{gen},\theta_{disc}) = \mathcal{L}_{fit}(f(x;\theta_{gen}),y) + \lambda \mathcal{L}_{adv}(f(x;\theta_{gen});x,\theta_{disc}), \quad (1)$$

where x and y are the input image and the corresponding label map (i.e., ground-truth label data) respectively, $\theta_{gen}$ and $\theta_{disc}$ are the set of parameters for the generator and discriminator networks $f(x; \theta)$, represents a transformation on input image x, imposed by a network parameterized by $\theta$, and $\lambda$ indicates the relative importance of the adversarial loss term.

Figure 1:
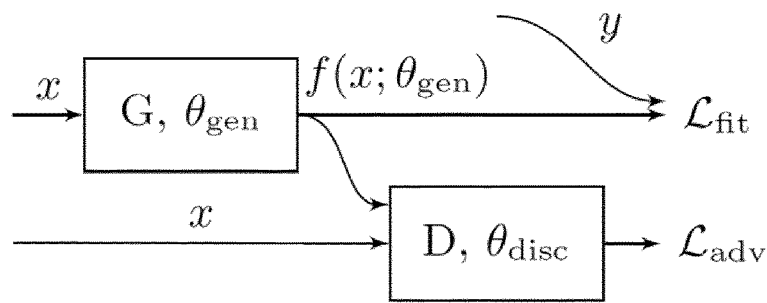
FIG. 1 is a schematic diagram of a conventional generative adversarial network.

FIG. 1 illustrates a typical training set-up for a traditional GAN. It shows a generator G and a discriminator D which are trained using the loss function of Equation (1) above.

The loss term $\mathcal{L}_{fit}$ is often formulated with a pixel-wise categorical cross entropy loss, $$\mathcal{L}_{cce}(f(x,\theta_{gen}),y)$$

where $$\mathcal{L}_{cce}(p,y) = \frac{1}{wh} \sum_{i}^{wh} \sum_{j}^{c} y_{i,j} \ln(p_{i,j}),$$

w and h are the width and height of the image, and c is the number of classes to which each pixel can be attributed.

The adversarial loss term, $\mathcal{L}_{adv}$ indicates how successful the discriminator is in rejecting the (fake) dense prediction maps produced by the generator and is often formulated with a binary cross entropy loss between zero and the binary prediction of the discriminator for a generated prediction map:

$$\mathcal{L}_{bce}(f(f(x;\theta_{gen});\theta_{disc}),0)$$

where $$\mathcal{L}_{bce}(\hat{z},z) = -z \ln(\hat{z}) - (1-z)\mathcal{L}\ln(1-\hat{z})$$

While the generator is trained to minimize its adversarial loss term, the discriminator tries to maximize it, by minimizing its loss defined as:

$$\mathcal{L}_{disc}(x,y;\theta_{gen},\theta_{disc}) = \mathcal{L}_{bce}(f(f(x;\theta_{gen});\theta_{disc}),1) + \mathcal{L}_{bce}(f(y;\theta_{disc}),0). \quad (2)$$

By training the discriminator first, and then training the generator, and then further training the discriminator, and so forth in an alternating pattern, the discriminator learns the differences between the label and prediction distributions, while the generator tries to change the qualities of its predictions, similar to that of the labels, such that the two distributions are not distinguishable. In practice, it is often observed that the training of the adversarial networks tends to be more tricky and unstable compared to training normal networks. This can be attributed to the mutual training of the two networks involved in a minimax game such that each affects the training of the other. The discriminator gives feedback to the generator based on how plausible the generator images are.

There are two important issues with such traditional adversarial training and its application to semantic segmentation, which are mitigated in embodiments of the invention:
1. The notion of plausibility and fake-ness of these prediction maps comes from the discriminator's imagination of these concepts and how its weights encode these qualities. This encoding is likely to be far from perfect, resulting in gradients in directions that are likely not improving the generator.
2. The adversarial loss term calculation is not exploiting the valuable piece of information on image/label pairing that is often available for many of the supervised semantic segmentation tasks.

Adversarial Training with Embedding Loss

In contrast to conventional approaches, the present EI-GAN embodiments exploit the image-label pairing to base plausibility/fakeness decisions not only on the discriminator's understanding of these notions but also on a true plausible label map.

One way to utilize this idea is to use the discriminator to take the prediction/label maps into a higher-level description and define the adversarial loss as their difference in embedding space:

$$\mathcal{L}_{gen}(x,y;\theta_{gen},\theta_{disc}) = \mathcal{L}_{fit}(f(x;\theta_{gen}),y) + \lambda \mathcal{L}_{adv}(f(x;\theta_{gen}),y;x,\theta_{disc}), \quad (3)$$

where $$\mathcal{L}_{adv}(f(x;\theta_{gen}),y;x,\theta_{disc})$$

is set equal to the embedding loss $$\mathcal{L}_{emb}(f(x;\theta_{gen}),y;x,\theta_{disc}),$$

defined as the $L_2$ distance over embeddings:

$$\mathcal{L}_{emb}(p,y;x,\theta_{disc}) = \|f_e(y;x,\theta_{disc}) - f_e(p;x,\theta_{disc})\|_2, \quad (4)$$

where $$f_e(p;x,\theta)$$

represents the embeddings extracted from a given layer in the network parameterized with θ, given p and x as its inputs. An "embedding" in this context refers to a set of feature-maps taken at a certain layer in the discriminator.

Figure 2:
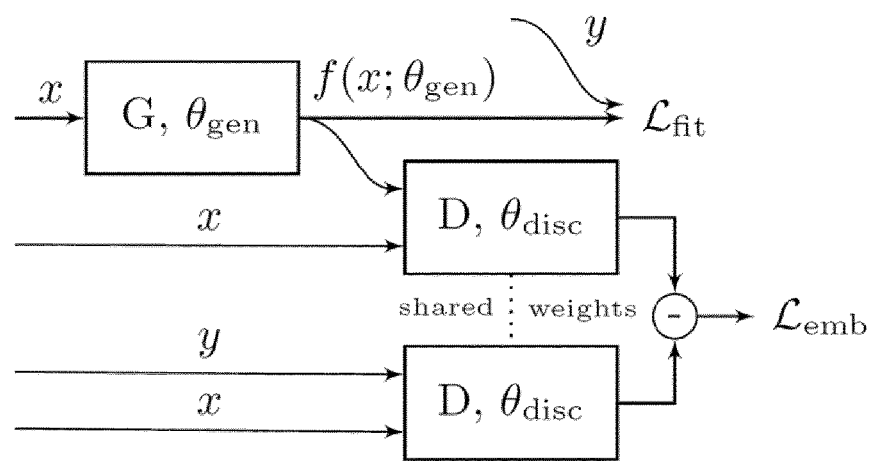
FIG. 2 is a schematic diagram of a generative adversarial network embodying the invention.

FIG. 2 illustrates such training of a generator G and a discriminator D. In contrast to the conventional approach of FIG. 1, the discriminator D not only receives an image, x, and its corresponding generated segmentation map, f (x; θ), from the generator G, but is also trained on the ground-truth label data, y, corresponding to the image, x. The discriminator D is shown in FIG. 2 as two separate discriminator instances, having shared weights, for clarity, to highlight the distinct sets of inputs and outputs: [image, fake label] and [image, real label]. The two instances share the same weights so can conceptually be seen as a single discriminator network, D.

Thus, the EI-GAN architecture computes the adversarial loss and the corresponding gradients based on a difference in high-level descriptions (embeddings) of labels and predictions. While the discriminator learns to minimize its loss on the discrimination between real and fake distributions, and likely learns a set of discriminative embeddings, the generator tries to minimize this embedding difference.

In some embodiments, Equation 2 for discriminator updates may optionally be rewritten as:

$$\mathcal{L}_{disc}(x,y;\theta_{gen},\theta_{disc}) = -\mathcal{L}_{emb}(f(x;\theta_{gen}),y;x,\theta_{disc}). \quad (5)$$

However, in empirical studies, the applicant has found that using the cross entropy loss for updating the discriminator parameters gives better results in at least some situations.

Experimental Setup

An evaluation of the EI-GAN method will now be described, followed by details of the network architectures and training methods. The words "we" and "our" in the following refer to the present applicant.

Experimental Setup—Evaluation Datasets and Metrics

The EI-GAN method has been evaluated within the application domain of autonomous driving. In particular, it is evaluated using data from the lane-marking detection data that is publicly available from TuSimple™ via their website—http://benchmark.tusimple.ai/#t/1. However, it will be understood that the method is generic and can also be applied to other semantic segmentation problems.

One of the motivations of these embodiments is to be able to produce predictions that, as far as possible, resemble the ground truth labels. This is in particular useful for the TuSimple™ lane marking detection data set with thin structures, reducing the need for complicated post-processing. The TuSimple™ lane marking detection dataset1 consists of 3,626 annotated 1280×720 front-facing road images on US highways in the San Diego area divided over four sequences, and a similar set of 2782 test images. The annotations are given in the form of polylines of lane markings: those of the ego-lane and the lanes to the left and right of the car. The polylines are given at fixed height-intervals every 20 pixels. To generate labels for semantic segmentation, we convert these to segmentation maps by discretizing the lines using smooth interpolation with a Gaussian with a sigma of 1 pixel wide.

Figure 4:
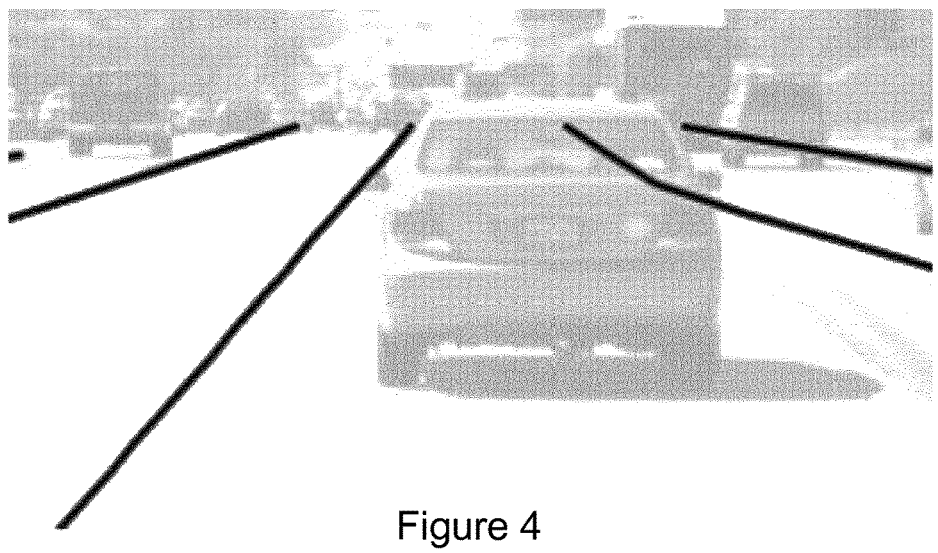
FIG. 4 is an example ground-truth label for lane-marking segmentation, overlaid on a corresponding photographic image.

FIG. 4 shows an example of such a label. The label is here shown overlaid on the original image for clarity, but it will be appreciated that the label data is distinct from the image data.

The dataset is evaluated on results in the same format as the labels, namely multiple polylines. For our evaluation we use the official metrics as defined in the challenge, namely accuracy, false positive rate, and false negative rate. We report results on the official test set as well as on a validation set which is one of the labeled sequences with 409 images ('0601'). We note that performance on this validation set is perhaps not fully representative, because of its small size. A different validation sequence also has its drawbacks, since the other three are much larger and will significantly reduce the size of the already small data set. Since our network still outputs segmentation maps rather than the required polylines, we do apply post-processing, but keep it as simple as possible: after binarizing, we transform each connected component into a separate polyline by taking the mean x-index of a sequence of non-zero values at each y-index. We refer to this method as 'basic'. We also evaluate a 'basic++' version which also splits connected components in case it detects that multiple sequences of non-zero values occur at one sampling location.

Experimental Setup—Network Architectures and Training

In this section we discuss the network and training set-up used for our experiments.

Figure 3:
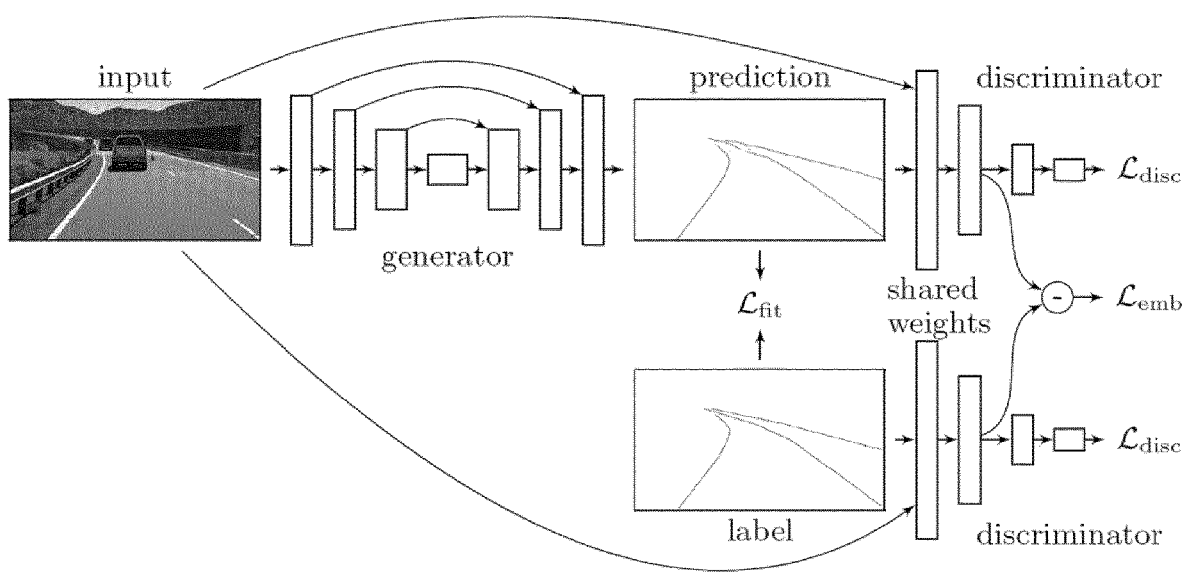
FIG. 3 is a schematic diagram of the generative adversarial network being trained for lane-marking segmentation.

FIG. 3 shows an overview of the high-level network architecture with example data. This shows the different loss terms used for either the generator or discriminator training, or both.

For the generator we use a fully-convolutional U-Net style network with a downwards and an upwards path and skip connections. In particular, we use the Tiramisu DenseNet architecture for lane marking detection, configured with seven up/down levels for a total of sixty-four 3×3 convolution layers. See "The One Hundred Layers Tiramisu: Fully Convolutional DenseNets for Semantic Segmentation" by Jégou et al., CVPRW (July 2017), 1175-1183.

For the discriminator we use a DenseNet architecture with seven blocks and a total of thirty-two 3×3 convolution layers (see "Densely Connected Convolutional Networks" by Huang et al., CVPR (2017)), followed by a fully-convolutional patch-GAN classifier (see "Precomputed Real-Time Texture Synthesis with Markovian Generative Adversarial Networks" by Li & Wand, ECCV (2016), 702-716).

We use a two-headed network for the first two dense blocks to separately process the input image from the labels or predictions, after which we concatenate the feature maps. We take the embeddings after the final convolution layer. However, other options are also possible, as described in the ablation studies below.

We first pre-train the generator models until convergence, which we also use as our baseline non-GAN model in the Results section below. Using a batch size of eight, we then pre-train the discriminator for 10,000 iterations, after which alternate between 300 and 200 iterations of generator and discriminator training, respectively. The generator is trained with the Adam optimizer (see "Adam: A method for Stochastic Optimization" by Kingma & Ba, ICLR (2014)), while the discriminator training was observed to be more stable using SGD. We train the discriminator using the regular cross entropy loss (Equation 2), while we train the generator with the adversarial embedding loss with $\lambda=1$ (Equations 3 and 4). We did not do any data augmentation nor pre-train the model on other data.

The details of the particular network architecture set-up used for our experiments are as follows.

The generator features are:
architecture=Tiramisu DenseNet;
number of dense blocks in down/up sampling paths=7;
number of 3×3 cony layers in each dense block=[1, 2, 3, 4, 6, 8, 8];
growth-rate=18;
non-linearity=ReLU;
initialization=He [see "Delving Deep into Rectifiers: Surpassing Human-Level Performance on ImageNet Classification" by He et al., ICCV (2015), 1026-1034]; and
dropout rate=0.1.

The discriminator features are:
architecture=two-headed DenseNet;
joining the two heads=concatenation after the second dense block;
number of dense blocks=7;
number of 3×3 cony layers in each dense block=[1, 2, 3, 4, 6, 8, 8];
growth-rate=8;
non-linearity=ELU [see "Fast and Accurate Deep Network Learning by Exponential Linear Units (ELUs)" by Clevert et al., ICLR (2015)];
no dropout; and
embeddings taken from layer=after 7th dense block.

The general training hyper-parameters are:
number of iterations=150K;
batch size=8; and
training schedule=(300: disc, 200: gen).

The generator training hyper-parameters are:
optimizer=(Adam, momentum: 0.9);
learning rate=(exponential, init: 5e-4, decay power: 0.99, decay rate: 200)
L2 regularization scale=1e-4; and
pre-training=100K iterations.

The discriminator training hyper-parameters are:
optimizer=vanilla SGD;
learning rate=(exponential, init: 1e-5, decay power: 0.99, decay rate: 800);
pre-training=10K iterations;
L2 regularization scale=1e-5; and
adversarial loss $\lambda=1$.

Results

In this section we report the results on the TuSimple™ datasets using the experimental set-up described above. Additionally, we perform three ablation studies: evaluating the training stability, exploring the options for the training losses, and varying the choice for embedding loss layer.

Results—TuSimple™ Lane Marking Challenge

In this section we report the results of the TuSimple™ lane marking detection challenge and compare them with our baseline and the state-of-the-art.

Figure 5:
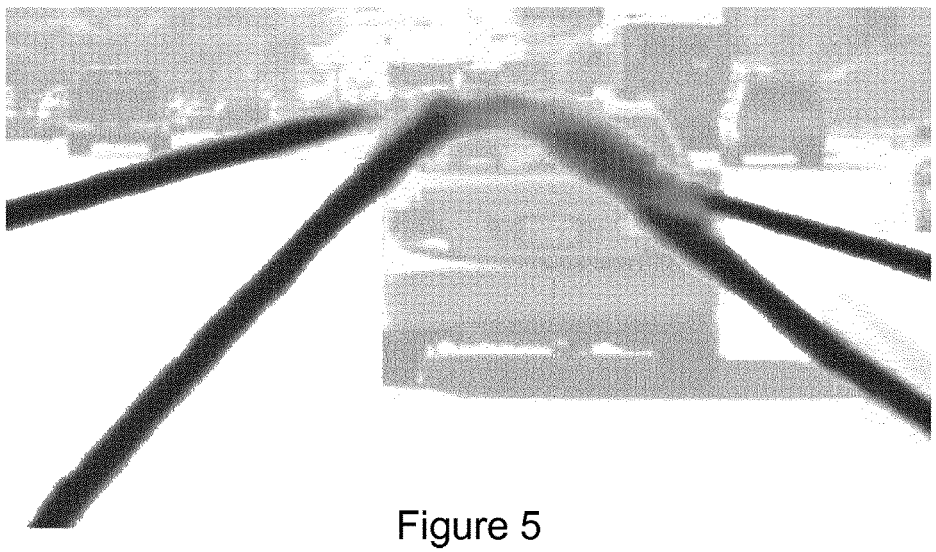
FIG. 5 is a corresponding raw prediction from a conventional segmentation network, overlaid on the photographic image.
Figure 6:
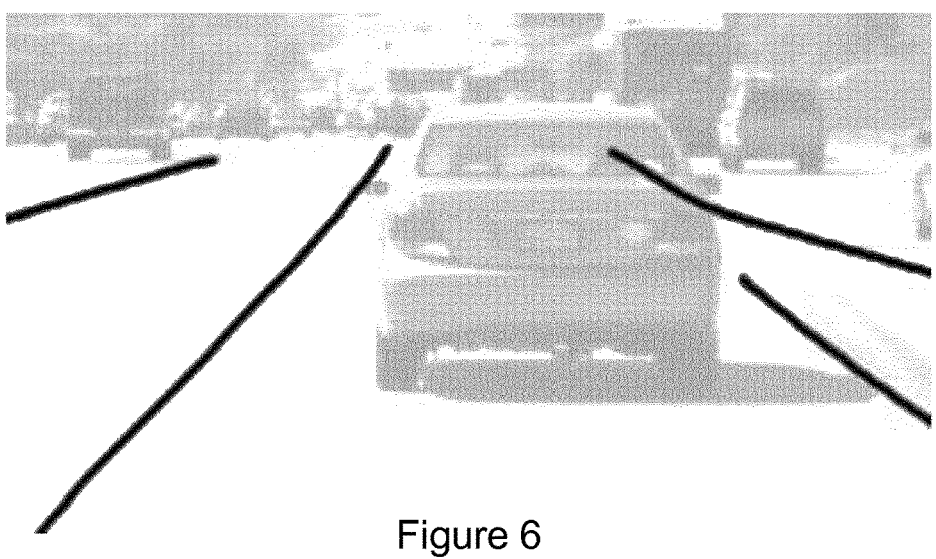
FIG. 6 is a corresponding raw prediction from a generative adversarial network embodying the invention, overlaid on the photographic image.

FIG. 4, as already mentioned, shows an example ground truth label. FIG. 5 shows the corresponding raw prediction, for the same image, by a conventional segmentation network. FIG. 6 shows a corresponding raw prediction by EI-GAN. It can be seen that the prediction in FIG. 6 more accurately matches the lines of the labels of FIG. 4, in terms of width, certainty and connectivity, than the conventional output of FIG. 5. In all three cases, the data is overlaid on the input image for convenience.

We first evaluated EI-GAN and our baseline on the validation set using both post-processing methods. The results in Table 1 show that the basic post-processing method is not suitable for the baseline model, while the improved basic++ method performs a lot better. Still, EI-GAN outperforms the baseline, in particular with the most basic post-processing method.

TABLE 1

Results on TuSimple lane marking validation set

| Method | Post-processing | Accuracy (%) | FP | FN |
| --- | --- | --- | --- | --- |
| Baseline (no GAN) | basic | 86.2 | 0.089 | 0.213 |
| Baseline (no GAN) | basic++ | 94.3 | 0.084 | 0.070 |
| EI-GAN | basic | 93.3 | 0.061 | 0.104 |
| EI-GAN | basic++ | 94.9 | 0.059 | 0.067 |

Figures 7, 8:
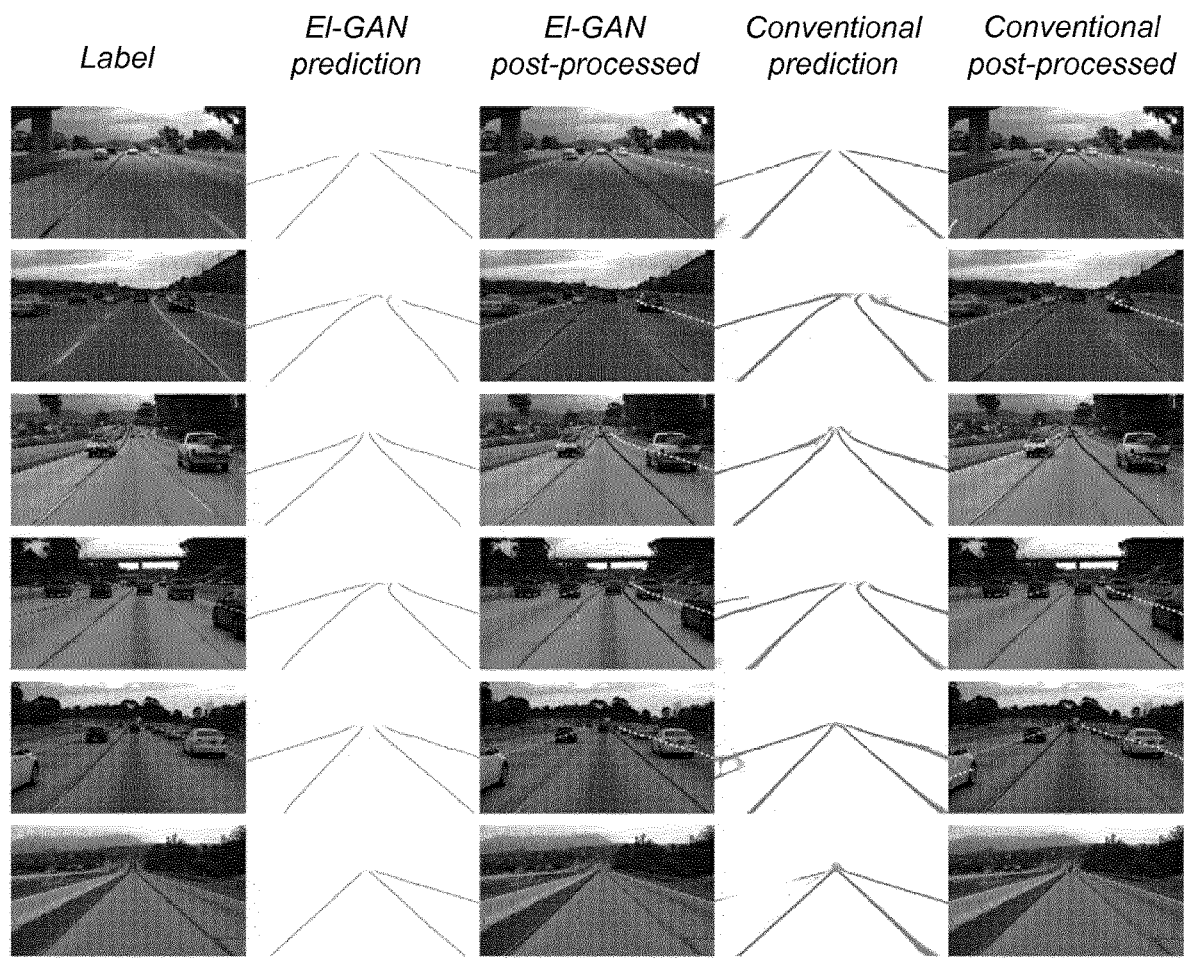
FIG. 7 is a table having six rows corresponding to six different example photographic images, and columns showing the ground-truth label, outputs from a generative adversarial network embodying the invention, and outputs from a conventional segmentation network.
FIG. 8 is a graph of validation f-score against training iterations for different adversarial loss terms.

FIG. 7 shows some results on the validation set. It compares the two methods in terms of raw prediction maps and post-processed results using the basic++ method. EI-GAN can be seen to produce considerably thinner and more label-like output with less noise, compared with the conventional baseline approach, making post-processing easier in general.

Furthermore, we train EI-GAN and the baseline on the entire labeled dataset, and evaluate using the basic++ post-processing on the official test set of the TuSimple™ challenge. Table 2 shows the results, which includes all methods in the top six and their rank on the leaderboard as of Mar. 14, 2018. EI-GAN ranks 4th based on accuracy with a difference less than half a percent to the best, and obtains the lowest false positive rate. Compared to our baseline (without a discriminator), we show improvements in line with our experiments of Table 1 on the validation set.

TABLE 2

TuSimple lane marking challenge leaderboard (test set) as of Mar. 14, 2018:

| Rank | Method | Name on board | Accuracy (%) | FP | FN |
|---|---|---|---|---|---|
| #1 | Unpublished | leonardoli | 96.87 | 0.0442 | 0.0197 |
| #2 | Pan et al. [3] | XingangPan | 96.53 | 0.0617 | 0.0180 |
| #3 | Unpublished | aslarry | 96.50 | 0.0851 | 0.0269 |
| #5 | Neven et al. [2] | DavyNeven | 96.38 | 0.0780 | 0.0244 |
| #6 | Unpublished | li | 96.15 | 0.1888 | 0.0365 |
| #14 | Baseline (no GAN) | N/A | 94.54 | 0.0733 | 0.0476 |
| #4 | EI-GAN | Tom Tom EI-GAN | 96.39 | 0.0412 | 0.0336 |

Results—Ablation Studies

Table 3 compares the use of embedding/cross entropy as different choices for adversarial loss term for training of the generator and the discriminator networks. To compare the stability of the training, statistics over validation accuracies are reported.

TABLE 3

TuSimple validation set accuracy statistics over different training iterations (every 10K), comparing the stability of different choices for adversarial losses

| Loss | | Accuracy statistics: | | | |
|---|---|---|---|---|---|
| Generator | Discriminator | mean | var: | max : | Equations |
| Cross entropy | Cross entropy | 33.84 | 511.71 | 58.11 | 1 and 2 |
| Cross entropy | Embedding | 0.00 | 0.00 | 0.02 | 1 and 5 |
| Embedding | Embedding | 93.97 | 0.459 | 94.65 | 3, 4 and 5 |
| Embedding | Cross entropy | 94.17 | 0.429 | 94.98 | 3, 4 and 2 |

FIG. 8 shows a graph illustrating the validation F-score during training. These results show that using the embedding loss for the generator makes GAN training stable. We observed similar behavior when training with other hyper-parameters.

The features used for the embedding loss can be taken at different locations in the discriminator. In this section we explore three options: taking the features either after the 3rd, 5th, or 7th dense block. We note that the 3rd block contains the first shared convolution layers with both the image input and the predictions or labels, and that the 7th block contains the final set of convolutions before the classifier of the network. Results for the TuSimple™ lane marking detection validation set are given in Table 4 and in FIG. 9. From the results, we conclude that the later we take the embeddings, the better the score and the more similar the predictions are to the labels, at least for this data set.

TABLE 4

Choosing the embedding loss layer

| Embedding loss after block # | Accuracy (%) | FP | FN |
|---|---|---|---|
| Dense block 3 (first block after joining) | 93.91 | 0.1013 | 0.1060 |
| Dense block 5 | 94.01 | 0.0733 | 0.0878 |
| Dense block 7 (before classifier) | 94.94 | 0.0592 | 0.0673 |

Evaluation

In this section we evaluate the described embodiment and the results.

Evaluation—Comparison with Other Lane Marking Detection Methods

In Table 2 we showed the results on the TuSimple™ lane marking data set with EI-GAN ranking 4th on the leaderboard. In this section, we compare our method in more detail to the other two published methods: Pan et al. [see "Spatial As Deep: Spatial CNN for Traffic Scene Understanding" by Pan et al., AAAI (February 2018)] (ranking 2nd) and Neven et al. [see "Towards End-to-End Lane Detection: an Instance Segmentation Approach" by Neven et al., ArXiv e-prints (February 2018)] (ranking 5th).

Both of these works use a multi-class approach to lane marking detection, in which each lane marking is a separate class. Although this eases post-processing, it requires more label creation complexity and makes the task for the network more difficult: it should now also learn which lane is which, requiring a larger field of view and yielding ambiguities at lane changes. In contrast, with our GAN approach, we can learn a simpler single-class problem without requiring complex post-processing to separate individual markings.

Neven et al. also argue in their work that post-processing techniques such as curve fitting are preferably not done on the output of the network, but rather in a birds-eye perspective. To this extent they train a separate network to learn a homography to find a perspective transform for which curve fitting is easier.

In our work we show that it is possible to achieve comparable accuracy results without having to perform curve fitting at all, thus omitting the requirement for training and evaluating a separate network for this purpose.

Pan et al. argue that problems such as lane marking detection can benefit from spatial consistency and message passing before the final predictions are made. For this reason they propose to feed the output of a regular segmentation network into a problem specific 'spatial CNN' with message passing convolutions in different directions. This does indeed result in a better accuracy on the TuSimple™ data set compared to EI-GAN, however, it is unclear how much is attributed to their spatial CNN and how much to the fact that they train on a non-public data set which is twenty times larger than the regular TuSimple™ data set.

Evaluation—Analysis of the Ablation Study

As we observed in the comparison of the different adversarial loss terms as presented in Table 3 and FIG. 8, using the embedding loss for the generator makes the training more stable and prevents collapses. The embedding loss, in contrast to the usual formulation with the cross entropy loss, provides stronger signals as it leverages the existing ground-truth rather than basing it only on the discriminator's internal representations of fake-ness and plausibility.

Therefore, using a normal cross entropy loss can result in collapses, in which the generator starts to explore samples in the feature space where the discriminator's fake/real comprehension is not well formed. In contrast, using the embedding loss, such noise productions result in high differences in the embedding space and is strictly penalized by the embedding loss. Furthermore, having an overwhelming discriminator that can perfectly distinguish the fake and real distributions results in training collapses and instability. Hence, using an embedding loss with better gradients that flow back to the generator likely results in a more competent generator. Similarly, it is no surprise that using an embedding loss for the discriminator and not for the generator results in a badly diverging behavior due to a much more dominating discriminator and a generator that is not penalized much for producing noise.

Figure 9:
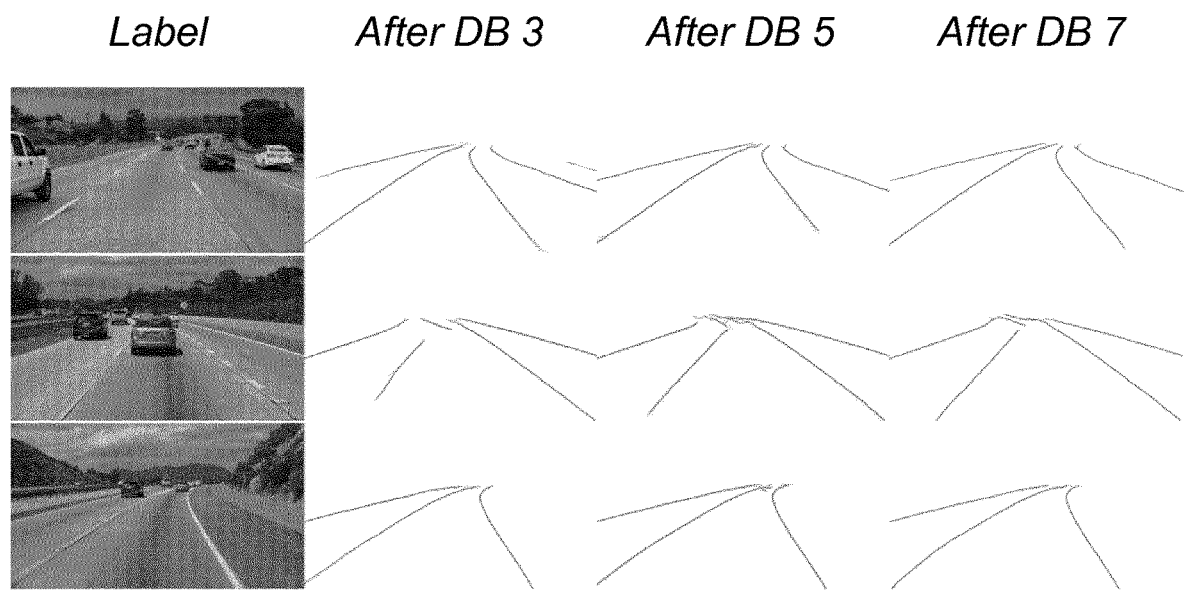
FIG. 9 is a table having three rows corresponding to three different example photographic images, and columns showing the ground-truth label, and outputs from a generative adversarial network embodying the invention after different respective dense blocks within the network.

In the second ablation study, as presented in Table 4 and FIG. 9, we observed that using deeper representations for extracting the embeddings results in better performance. This is perhaps due to a larger receptive field of the embeddings that better enables the generator to improve on the higher-level qualities and consistencies.

Evaluation—GANs for Semantic Segmentation

Looking more closely at the comparison between a regular CNN and EI-GAN (see FIG. 7), we see a distinct difference in the nature of their output. The non-GAN network produces a probabilistic output with a probability per class per pixel, while EI-GAN's output is similar to a possible label, without expressing any uncertainty. The lack of being able to express uncertainty might naively be seen as hindering further post-processing. However, the first step of commonly applied post-processing schemes is removing the probabilities by thresholding or applying argmax. In addition, the independent per-pixel probabilistic output of the regular CNN might hide inter-pixel correlation necessary for correct post-processing. The cross entropy loss pushes the network to output a segmentation distribution that does not lie on the manifold of possible labels.

In EI-GAN and other GANs for semantic segmentation, networks are trained to output a sample of the distribution of possible labels conditioned on the input image.

Figure 10:
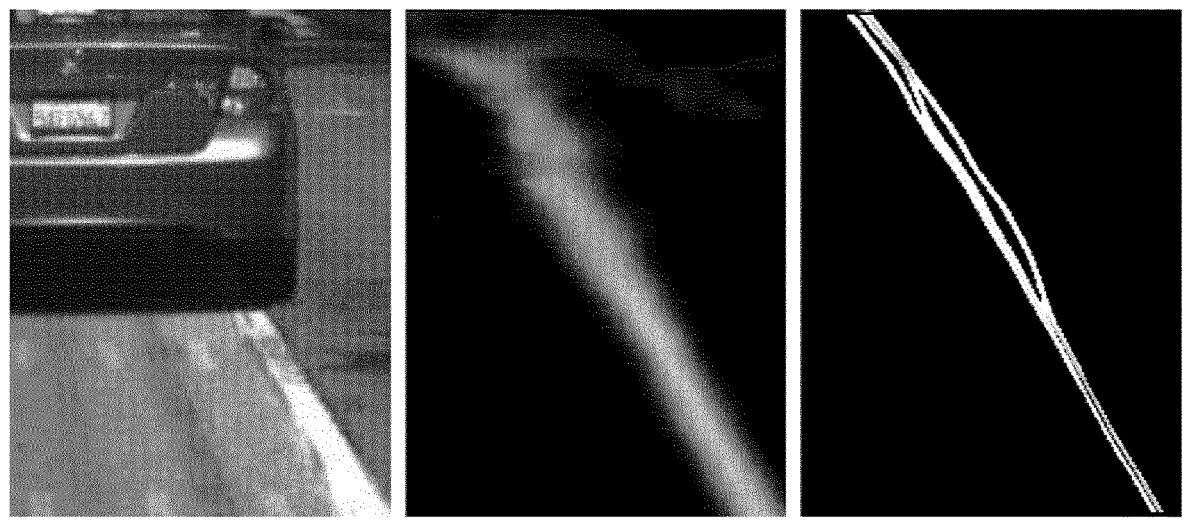
FIG. 10 is a table showing first a close-up portion of an input image, second the segmentation output of a conventional segmentation network, and third the overlaid segmentation outputs of three different generative adversarial networks embodying the invention.

FIG. 10 shows an example which illustrates the selection of a sample once the lane marking is occluded and the network becomes more uncertain. The left view is a close-up of input data. The central view is a conventional semantic segmentation output. The right view shows the overlaid output of three different EI-GAN models trained with the same settings. Although this sacrifices the possibility to express uncertainty, the fact that it lies on, or close to, the manifold of possible labels, can make post-processing easier and more accurate. For the task of lane marking detection we indeed have shown that the semantic segmentation does not need to output probabilities. However, for other applications this might not be the case. A straightforward approach to re-introduce expressing uncertainty by a GAN, would be to simply run it multiple times conditioned on extra random input or use an ensemble of EI-GANs. The resulting samples which model the probability on the manifold of possible labels would then be the input to post-processing.

We have, in the above, disclosed, studied and compared EI-GAN as a method to preserve label-resembling qualities in the predictions of the network. We showed that using EI-GAN results in a more stable adversarial training process. Furthermore, we achieved state-of-the-art results on the TuSimple™ challenge, without using any extra data or complicated hand-engineered post-processing pipelines, as opposed to the other competitive methods.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A method of training a generative adversarial network for performing semantic segmentation of images, wherein the generative adversarial network comprises: a generator neural network; and a discriminator neural network comprising one or more layers before a classifier, the method comprising:

providing an image as input to the generator neural network;

receiving a predicted segmentation map for the image from the generator neural network;

providing: (i) the image, (ii) the predicted segmentation map, and (iii) ground-truth label data corresponding to the image, as distinct training inputs to the discriminator neural network;

determining a set of one or more outputs from the discriminator neural network in response to said training inputs, wherein the one or more outputs comprise one or more embedding outputs taken from at least one of the layers within the discriminator neural network; and training the generator neural network using a loss function that is a function of said set of outputs from the discriminator neural network.

2. The method of claim 1, wherein the loss function comprises an embedding term that represents a difference between: (i) an embedding at a predetermined layer of the discriminator neural network when the predicted segmentation map is input to the discriminator neural network, and (ii) an embedding at the predetermined layer of the discriminator neural network when the ground-truth label data is input to the discriminator neural network.

3. The method of claim 2, wherein the difference is an L2 distance.

4. The method of claim 2, wherein the predetermined layer is located immediately after the first dense block that contains one or more shared convolution layers with both the image and the predicted segmentation map.

5. The method of claim 2, wherein the predetermined layer is located immediately after the final dense block before the classifier of the discriminator neural network.

6. The method of claim 2, wherein the loss function additionally comprises a pixel-level fitness term, and wherein the loss function comprises a weighting parameter, λ, for weighting the embedding term relative to the fitness term.

7. The method of claim 1, further comprising training the discriminator neural network to minimize a loss on the discrimination of the discriminator neural network between predicted segmentation maps and ground-truth label data.

8. The method of claim 1, further comprising using the trained generative adversarial network to segment a received image of a road and identify one or more lane markings in the image.

9. A computer processing system implementing a generative adversarial network for performing semantic segmentation of images, wherein the generative adversarial network comprises: a generator neural network; a discriminator neural network comprising one or more layers before a classifier; and training logic, and wherein the training logic is configured to:

provide an image as input to the generator neural network;

receive a predicted segmentation map for the image from the generator neural network;

provide: (i) the image, (ii) the predicted segmentation map, and (iii) ground-truth label data corresponding to the image, as distinct training inputs to the discriminator neural network;

determine a set of one or more outputs from the discriminator neural network in response to said training inputs, wherein the one or more outputs comprise one or more embedding outputs taken from at least one of the layers within the discriminator neural network; and train the generator neural network using a loss function that is a function of said set of outputs from the discriminator neural network.

10. The computer processing system of claim 9, wherein the loss function comprises an embedding term that represents a difference between: (i) an embedding at a predetermined layer of the discriminator neural network when the predicted segmentation map is input to the discriminator neural network, and (ii) an embedding at the predetermined layer of the discriminator neural network when the ground-truth label data is input to the discriminator neural network.

11. The computer processing system of claim 10, wherein the predetermined layer is located immediately after the first dense block that contains one or more shared convolution layers with both the image and the predicted segmentation map.

12. The computer processing system of claim 10, wherein the predetermined layer is located immediately after the final dense block before the classifier of the discriminator neural network.

13. The computer processing system of claim 10, wherein the loss function additionally comprises a pixel-level fitness term, and wherein the loss function comprises a weighting parameter, $\lambda$, for weighting the embedding term relative to the fitness term.

14. The computer processing system of claim 9, wherein the training logic is further configured to train the discriminator neural network to minimize a loss on the discrimination of the discriminator neural network between predicted segmentation maps and ground-truth label data.

15. The computer processing system of claim 9, wherein the generative adversarial network is configured, after being trained, to segment a received image of a road and identify one or more lane markings in the image.

16. A non-transitory computer readable storage medium storing instructions that, when executed by a computer processing system, cause the computer processing system to perform method of training a generative adversarial network for performing semantic segmentation of images, wherein the generative adversarial network comprises: a generator neural network; and a discriminator neural network comprising one or more layers before a classifier, the method comprising:

providing an image as input to the generator neural network;

receiving a predicted segmentation map for the image from the generator neural network;

providing: (i) the image, (ii) the predicted segmentation map, and (iii) ground-truth label data corresponding to the image, as distinct training inputs to the discriminator neural network;

determining a set of one or more outputs from the discriminator neural network in response to said training inputs, wherein the one or more outputs comprise one or more embedding outputs taken from at least one of the layers within the discriminator neural network; and training the generator neural network using a loss function that is a function of said set of outputs from the discriminator neural network.

17. The non-transitory computer readable storage medium of claim 16, wherein the loss function comprises an embedding term that represents a difference between: (i) an embedding at a predetermined layer of the discriminator neural network when the predicted segmentation map is input to the discriminator neural network, and (ii) an embedding at the predetermined layer of the discriminator neural network when the ground-truth label data is input to the discriminator neural network.

18. The non-transitory computer readable storage medium of claim 17, wherein the predetermined layer is located immediately after the first dense block that contains one or more shared convolution layers with both the image and the predicted segmentation map.

19. The non-transitory computer readable storage medium of claim 17, wherein the predetermined layer is located immediately after the final dense block before the classifier of the discriminator neural network.

20. The non-transitory computer readable storage medium of claim 17, wherein the loss function additionally comprises a pixel-level fitness term, and wherein the loss function comprises a weighting parameter, $\lambda$, for weighting the embedding term relative to the fitness term.

* * * * *